United States Patent [19]

Fremont

[11] 4,142,967
[45] Mar. 6, 1979

[54] PROCESS FOR ENHANCING RECOVERY OF TALL OIL SOAP FROM BLACK LIQUOR

[75] Inventor: Henry A. Fremont, Hamilton, Ohio

[73] Assignee: Champion International Corporation, Stamford, Conn.

[21] Appl. No.: 613,477

[22] Filed: Sep. 15, 1975

[51] Int. Cl.² ............................................. B01D 13/00
[52] U.S. Cl. ..................................... 210/23 F; 210/44
[58] Field of Search ...................... 162/16; 204/167; 210/23 F, 44, 321 R

[56] References Cited

U.S. PATENT DOCUMENTS

| 3,356,603 | 12/1967 | Drew | 162/16 X |
| 3,404,063 | 10/1968 | Harding | 162/16 |
| 3,519,558 | 7/1970 | Cooper IV, et al. | 210/23 F |
| 3,749,657 | 7/1973 | LeBras et al. | 210/23 F X |
| 3,758,405 | 9/1973 | Fremont | 210/23 F |
| 3,917,526 | 11/1975 | Jennings | 210/321 R X |

OTHER PUBLICATIONS

Michaels et al., Membrane Ultrafiltraton, Jan. 1971, Chemical Technology, pp. 56-63.

*Primary Examiner*—Robert H. Spitzer
*Attorney, Agent, or Firm*—Evelyn M. Sommer

[57] ABSTRACT

Black liquor obtained from the sulfate pulping of resinous woods, such as that obtained from sulfate pulp digestors, is flowed into a skim tank where tall oil soap is skimmed from the surface. The skimmed effluent black liquor from the skim tank is passed through an ultrafiltration unit. Residual tall oil soap content in the black liquor effluent is concentrated in this unit and then recycled to the skim tank, while the permeate is sent to disposal. A by-pass is provided around the ultrafiltration unit to prevent build up of insoluble material such as fiber and other debris in the skim tank. The continued concentration of the tall oil soap in the skim tank causes the tall oil soap to agglomerate thereby decreasing its solubility in the black liquor, and allowing additional tall oil soap to be recovered. Improved yields of tall oil soap at lower costs and use of energy result. Tall oil is then produced by acidifying the recovered tall oil soap skimmings.

4 Claims, 2 Drawing Figures

- DISSOLVED SALTS
○ TALL OIL SOAP

PROCESS FOR ENHANCING RECOVERY OF TALL OIL SOAP FROM BLACK LIQUOR

DETAILED DESCRIPTION OF INVENTION

This invention relates to a process for enhancing the recovery of tall oil soap from black liquor. Black liquor is a product obtained from the pulping of resinous woods, such as pine wood, in sulfate pulp digestors.

Tall oil comes from the resinous woods used to make sulfate pulp. The highly alkaline chemicals used for sulfate (kraft) pulping convert the fats and resin in the pine wood into soaps which are called tall oil soap. The tall oil soap collects on the surface of the black liquor in the storage tanks. In the conventional process, tall oil soap is skimmed from the surface of the black liquor. Tall oil is then produced by acidifying the soap skimmings.

As pointed out in U.S. Pat. No. 3,356,603 granted Dec. 5, 1957, only a fraction of tall oil soap is recovered by such skimming. The major sources of tall oil soap losses appear to reside in: (1) the tall oil soap remaining with the pulp; (2) soap solubility in the black liquor; and (3) soap micelles which do not coacervate to sufficient size to permit removal by skimming. These losses amount to 40-50 percent of the wood tall oil constituent content as charged to the sulfate digestors.

In the aforesaid patent it is stated that the additional tall oil soap remains dispersed as ultrafine particles (and some probably as a solute) in the skimmed black liquor. The patent discloses a method of recovering additional tall oil soap from concentrated skimmed black liquor by subjecting a body of black liquor to an electrical discharge.

The subject invention is designed to permit the improved recovery of the micelle loses and reduction of the apparent solubility losses with improved yields, less cost, saving of energy, and without the use of an electrical discharge.

Broadly, the subject process comprises flowing black liquor before it is skimmed from a sulfate digestor into a skim tank (first zone) where the tall oil soap collects on the surface of the black liquor and is skimmed from the tank. The remaining black liquor phase, or skimmed effluent black liquor from the skim tank, is then passed through an ultrafiltration unit (second zone) equipped with a membrane, such as sold under the trade designation Abcor HFJ and HFD membranes. Residual tall oil soap content in the black liquor effluent is concentrated in this unit, and then recycled to the skim tank for skimming off the tall oil, while the permeate is disposed of. To prevent build up of insoluble materials, such as fiber and other debris in the skim tank, effluent containing the insoluble materials is bypassed around the ultrafiltration unit, as they accumulate in the skim tank, and disposed of, as for example, by combining the skimmed effluent with the permeate from the ultrafiltration unit, followed by multistage evaporation, and burning the residue in a recovery boiler.

Further objects and advantages of the invention will be apparent from a reading of the following detailed description taken in conjunction with the drawing in which.

Figure 1:
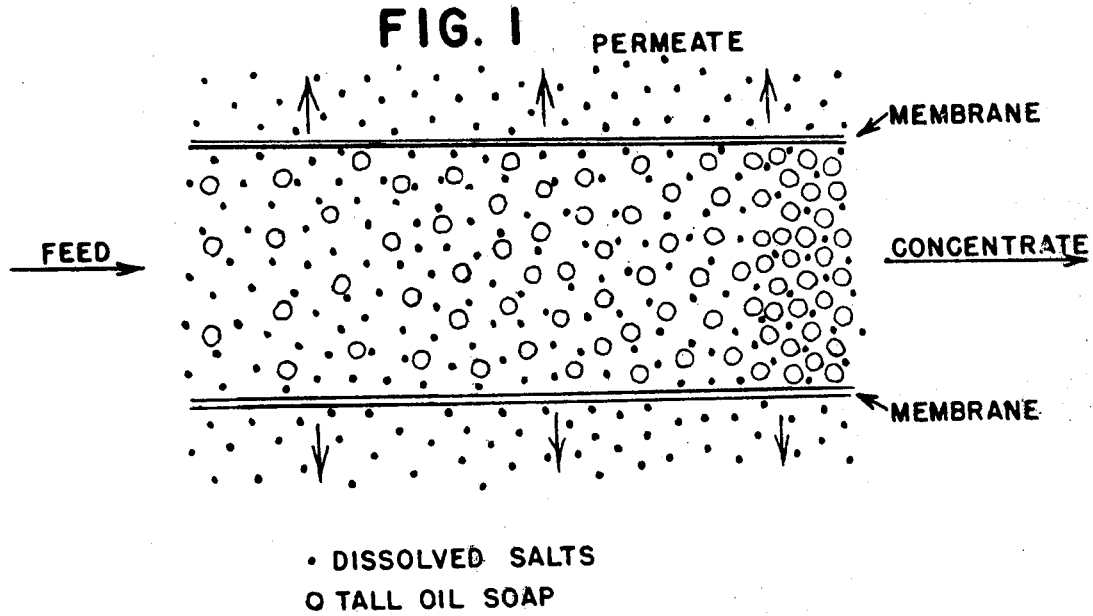
FIG. 1 is a simplified flow schematic of the principles of ultrafiltration.

Before describing the steps of the subject process a brief description will be provided relative to the general principles of ultrafiltration, with reference being made to FIG. 1.

Ultrafiltration is a membrane process for concentration of dissolved materials in aqueous solution. A semipermeable membrane is used as the separating agent and pressure as the driving force. In an ultrafiltration process (FIG. 1), a feed solution is fed into the membrane unit, where water and certain solutes pass through the membrane under an applied hydrostatic pressure. The solutes whose sizes are larger than the pore size of the membrane are retained and concentrated. The pore structure of the membrane thus acts as a molecular filter, passing some of the smaller solutes and retaining the larger solutes. The pore structure of this molecular filter is such that it does not become plugged because the solutes are rejected at the surface and do not penetrate the membrane. Furthermore, there is no continuous buildup of a filter cake which has to be removed periodically to restore flux through the membrane since concentrated solutes are removed in solution. Many ultrafiltration applications involve the retention of relatively high molecular weight solutes accompanied by the removal through the membrane of lower molecular weight impurities. Thus concentration of specific solution components can be achieved.

Considerations important for determining the technical and economic feasibility of ultrafiltration as applied to a specific process are the rate of solution transport through the membrane (flux) and the separation efficiency (rejection).

Membrane processes for treating pulp mill wastes have been under development for several years, focusing primarily on reverse osmosis. In reverse osmosis all dissolved solutes are concentrated, and a demineralized aqueous effluent is produced. Ultrafiltration is, in fact, a variation of reverse osmosis. The fundamental difference relates to the retention properties of the membranes: ultrafiltration membranes do not retain salts and other low molecular weight solutes.

There are several potential advantages of ultrafiltration when compared to reverse osmosis, which are:

(a) The use of ultrafiltration membranes leads to operation at lower pressures, typically 50 to 300 psig. The strength requirements of the membrane system are much less stringent than those for reverse osmosis systems, which typically operate above 400 psig. At the lower pressures used in ultrafiltration, power costs are less; membranes can last longer since the rate of "compaction" may be reduced; and lower capital costs can be achieved due to less demanding requirements for pressure vessels, pumps, etc. Reliability is also an important consideration, and system failure observed in reverse osmosis tests to date can be tied to the high operating pressures used. Important factors have been membrane compaction (resulting in reduced capacity), membrane catastrophic failure (membrane support rupture), and pump failure.

(b) With reverse osmosis the feed pine caustic extraction filtrate or decker effluent can be concentrated only to 8 to 10% total solids, or about 20-fold. This is due to limitations of both membrane fouling and a buildup in feed solution osmotic pressure. Both problems are of substantially less importance for ultrafiltration, in which very high volumetric concentration ratios are obtainable, up to or exceeding 200-fold. This is due primarily to a relatively slow increase in feed solids content with concentration by ultrafiltration. That is, only a small portion of the feed solids, specifically the higher molecular-weight organics, is retained by the ultrafiltration membrane. Note that about 80% of the dissolved solids in the wastes of interest are low molecular-weight salts. Since the retained solutes have relatively high molecular weights, osmotic pressure limitations are of minor importance, and solids levels up to 20% can be achieved in low-pressure ultrafiltration.

(c) Disposal cost of an ultrafiltration concentrate by incineration or other means would be substantially less than that for a reverse osmosis concentrate, since a substantially smaller volume must be treated. For example, in treating $2 \times 10^6$ gpd, about 100,000 gpd of reverse osmosis concentrate would be generated, but only 10,000 gpd of ultrafiltration concentrate. Furthermore the high organic content of the latter provides substantial heating value, almost sufficient in itself to sustain combustion. A major fuel cost would be required to burn a reverse osmosis concentrate which contains primarily inorganics. In addition a high chlorine content in a reverse osmosis concentrate of pine caustic extraction filtrate could cause severe corrosion problems during incineration, and would require extensive off-gas scrubbing to remove volatile chloride particulates.

(d) Membrane life data in the field in other applications has shown that ultrafiltration membranes are less susceptible than reverse osmosis membranes to deterioration in flux and rejection due to alkaline hydrolysis and/or compaction under pressure.

Further information relative to ultrafiltration may be obtained from Report EPA-660/2-73-019, Office of Research and Development, U.S. Environmental Protection Agency, Project No. S800261, Program Element 1B2037, entitled "Color Removal From Kraft Mill Effluents By Ultrafiltration" by H. A. Fremont et al., dated December 1973, such report being incorporated herein by reference.

Figure 2:
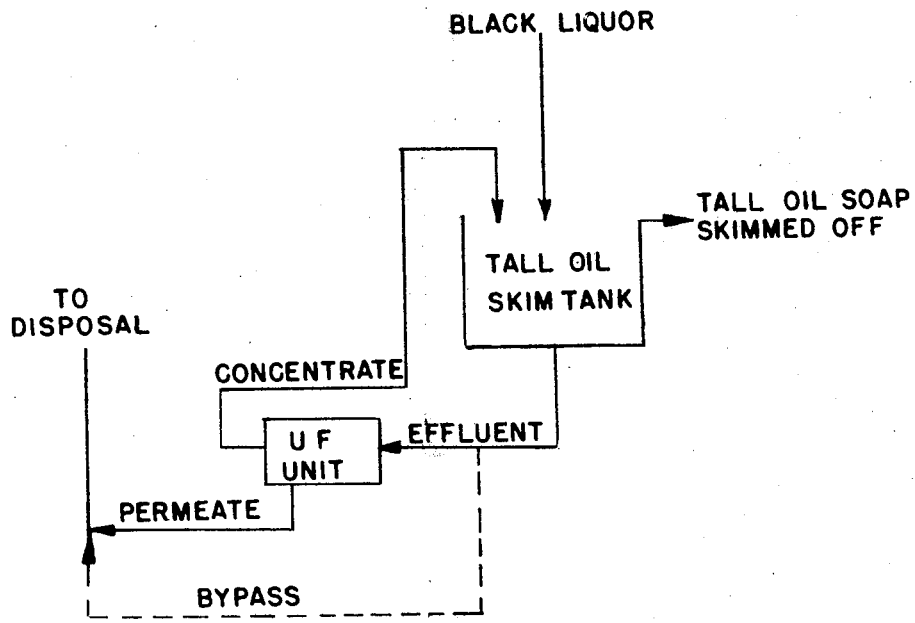
FIG. 2 is a schematic flow sheet of the subject process for enhancing the recovery of tall oil soap from black liquor.

Referring now to FIG. 2, a flow sheet of the subject process is illustrated. Black liquor from sulfate pulping pine wood is flowed to a tall oil skim tank. Preferably the subject process employs a black liquor which contains about 26 percent solids, is at a temperature of about 180° C., and has a pH greater than 13; usually from 13-14 pH. Such a black liquor is obtained when weak black liquor, as it comes from the digestor, is subjected to multiple stage evaporation in the conventional manner. The tall oil soap which accumulates on the surface of the black liquor in the skim tank is skimmed off in any conventional manner. The effluent from the skim tank is passed through an ultrafiltration unit (UF UNIT) which is equipped with membrane material. The membrane is designed to withstand the process conditions and has a pore size cut off of about 10,000 molecular weight. A membrane of this type is sold under the trade designations HFJ and HFD, and are membranes manufactured by Abcor, Inc., 341 Vassar Street, Cambridge, Mass. These are synthetic membrane systems which have a pore size of 15-20 Å. This pore size is measured by the ability of the membrane to retain a given molecular size of protein, in this case by a molecular weight of about 10,000. Ultrafiltration membranes may be used in a number of different geometries, for example, as diaphragms, as cast coated tubes or as spiral wound membranes.

A description of spiral wound membranes may be found in the above mentioned EPA report. Spiral wound membranes are a form which may also be used because they are the least expensive system and provide the highest membrane area per given volume of any of the systems which are practical. Fiber type membranes which provide the highest membrane area per volume are not practical for consideration and use with dirty streams such as treated with the subject process.

The black liquor tall oil soap content is concentrated by ultrafiltration in this unit, (UF UNIT), and the concentrate is then recycled to the skim tank. The permeate is disposed of in any suitable manner. Insoluble materials such as fibers and other debris in the effluent are by-passed around the ultrafiltration unit to prevent build up of such materials in the black liquor in the skim tank. Such materials are, for example, combined with the flow of permeate from the ultrafiltration unit for disposal, as described above.

Concentration of the tall oil content in the skim tank effluent by ultrafiltration causes the tall oil soap to agglomerate when it is returned to the skim tank, where the additional tall oil is recovered by skimming it off from the surface of the tall oil concentrated effluent. Increased tall oil concentration in the skim tank in this manner, we believe, decreases the apparent solubility of the soap in the black liquor, and thus permits ready recovery of additional tall oil soap.

The ultrafiltration step in the subject process for treatment of the skim tank effluents is preferably a continuous process. The effluent would be fed to the ultrafiltration unit continuously, and the ultrafiltration unit material would be recycled continuously, and from the unit two streams would flow continuously. The liquid flowing through the membranes (permeate) would be returned to the black liquor system. The concentrated liquid retained by the membranes would flow continuously to the skim tanks.

With the novel proces of the subject invention there are indications that we can recover up to 55% more tall oil per ton of pine pulp, with a reduction in the cost of production and a saving of energy.

I claim:

1. A process for enhancing the recovery of tall oil soap from black liquor which comprises skimming the tall oil soap from the black liquor in a first zone, subjecting the remaining black liquor phase to ultrafiltration in a second zone to concentrate the residual tall oil soap, recycling the concentrate to the first zone and allowing the tall oil soap to agglomerate, and skimming off the agglomerated soap in said first zone.

2. The process of claim 1 wherein the black liquor employed contains about 26 percent solids, is at a temperature of about 180° C., and has a pH greater than 13.

3. The process of claim 1, wherein insoluble materials in the remaining black liquor phase in the first zone are bypassed around the second zone to prevent their build up in the first zone.

4. The process of claim 1, wherein the remaining black liquor phase is subjected to ultrafiltration employing a membrane material which has a pore size cut off of about 10,000 molecular weight.

* * * * *